C. H. J. DILG.
MIXING MACHINE.
APPLICATION FILED MAR. 26, 1913.
1,180,020.
Patented Apr. 18, 1916.
3 SHEETS—SHEET 1.
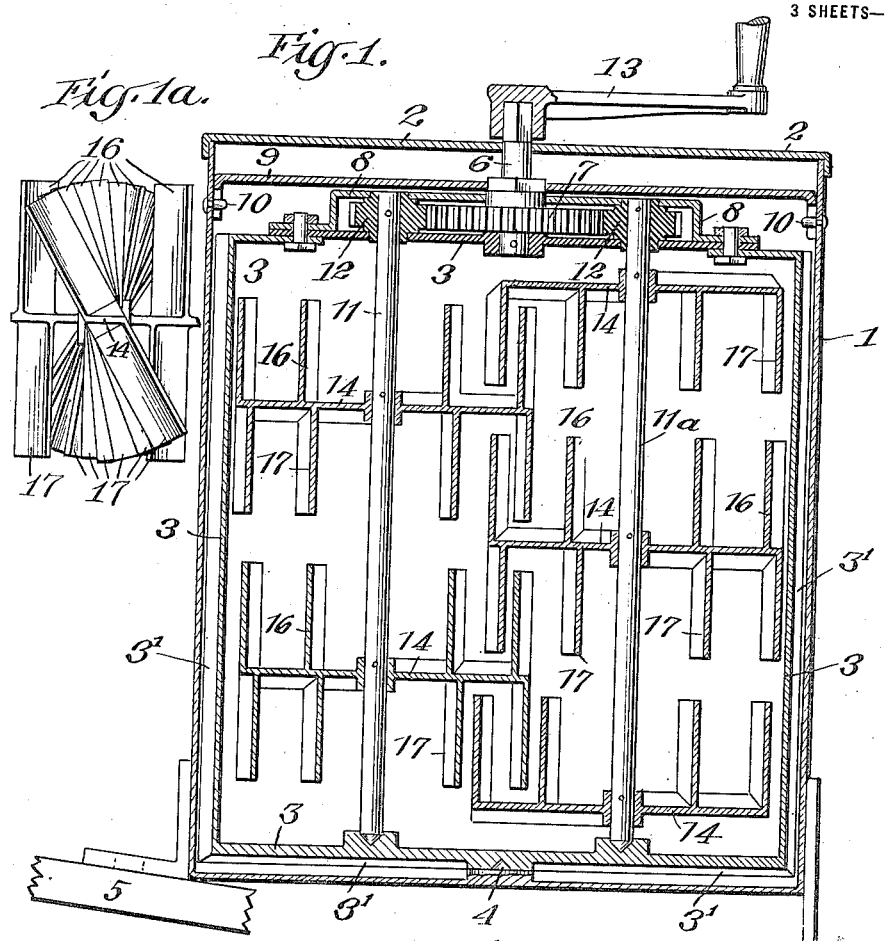
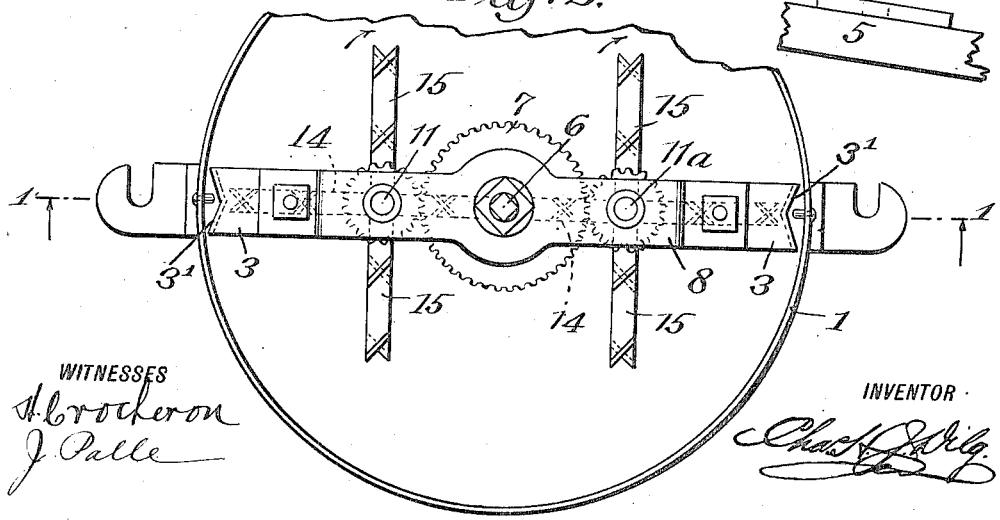
WITNESSES
INVENTOR

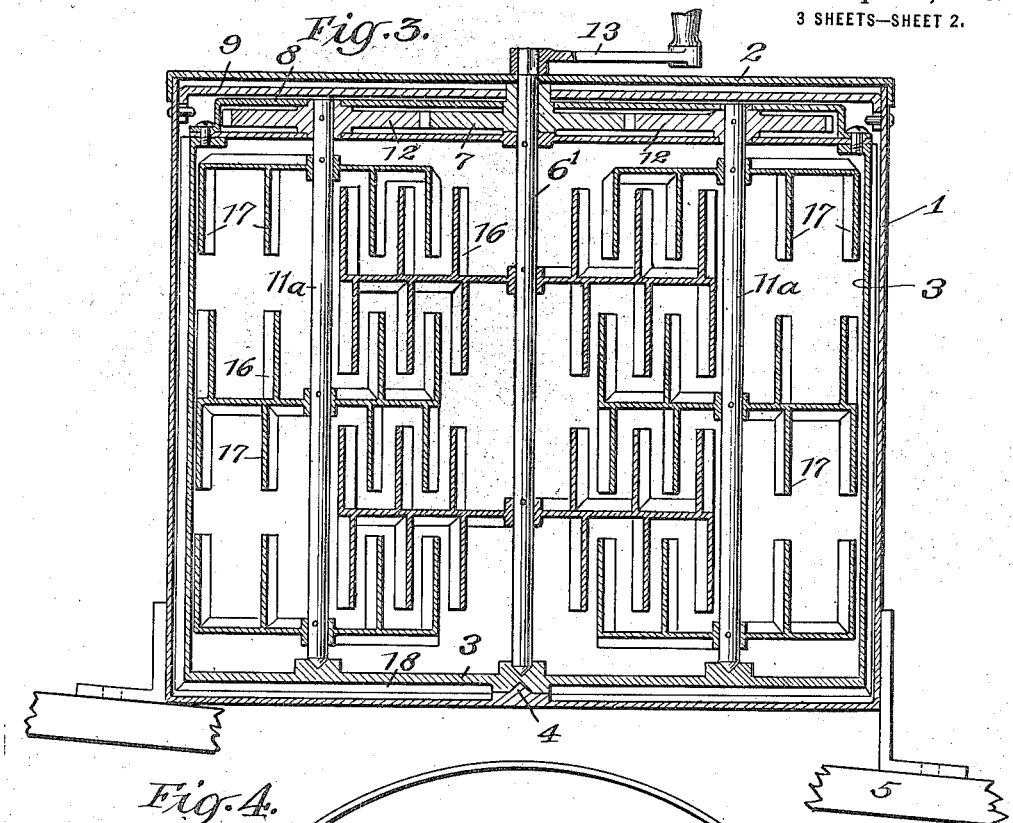
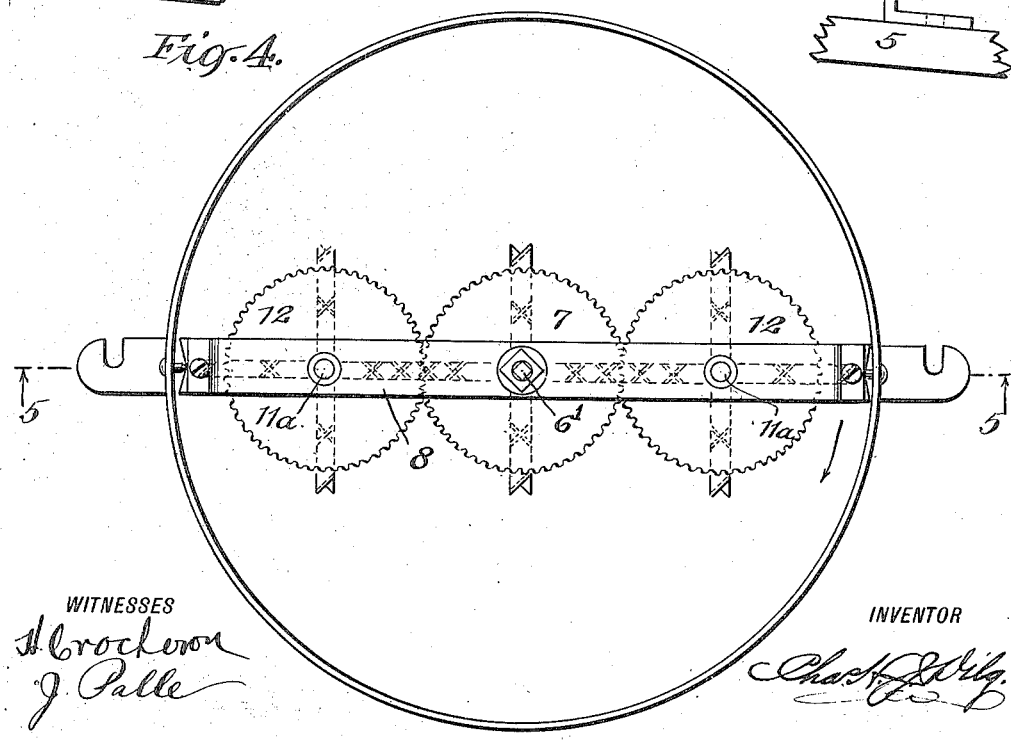

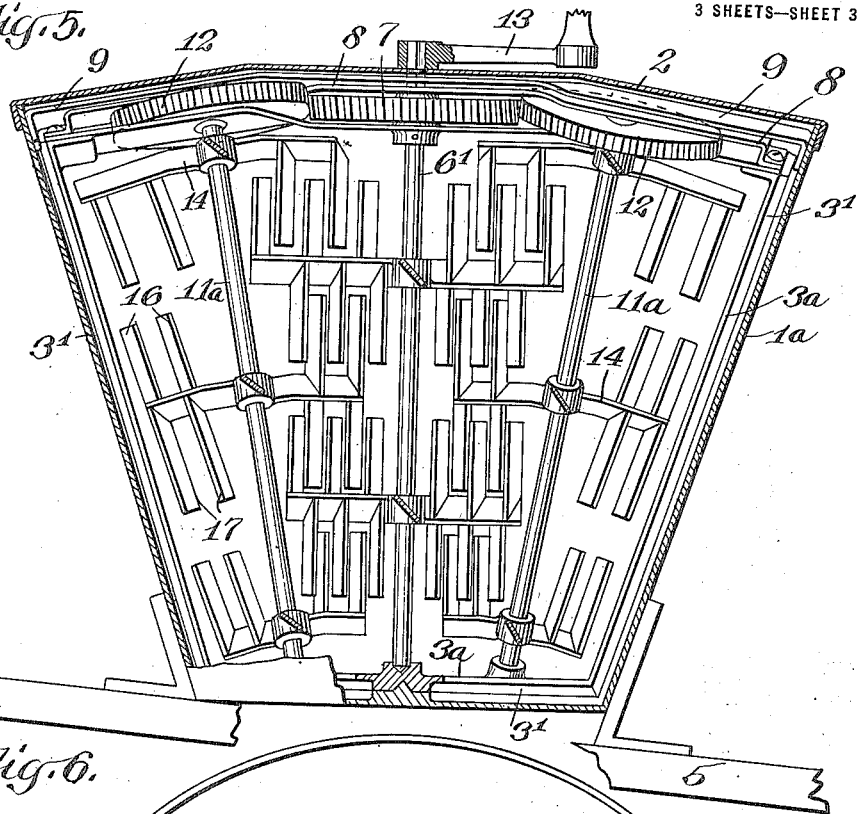

UNITED STATES PATENT OFFICE.

CHARLES H. J. DILG, OF NEW YORK, N. Y.

MIXING-MACHINE.

1,180,020. Specification of Letters Patent. Patented Apr. 18, 1916.

Application filed March 26, 1913. Serial No. 757,044.

*To all whom it may concern:*

Be it known that I, CHARLES H. J. DILG, a citizen of the United States, residing in the borough of the Bronx, city of New York, county of New York, and State of New York, have invented certain new and useful Improvements in Mixing-Machines, of which the following is a specification, reference being had therein to the accompanying drawings, forming part thereof.

My invention relates to mixing machines, and means embodying my invention are particularly adapted for mixing, stirring or agitating liquids, powders and other like miscible substances, mashing soft materials into pulp, freezing ice cream, making emulsions, churning, etc.

One object of my invention is to produce a device of this kind which will cause an intimate and thorough mixing or amalgamating of the ingredients or the substance being treated.

Other objects of my invention are simplicity, durability and economy of construction, and facility in operation.

Still other objects and advantages of my invention will appear from the following description.

My invention consists of various advantageous features of construction and arrangements and combinations of parts, as will hereinafter more fully appear.

I shall now describe the embodiments of my invention illustrated in the accompanying drawings and shall thereafter point out my invention in claims.

Figure 1 is a central sectional elevation of a machine embodying my invention, on line 1—1 of Fig. 2. Fig. 1ᴬ is a detail in end elevation of a modified form of paddle, with two arms broken away. Fig. 2 is a plan of the same with the cover, the locking bar and the operating handle removed. Fig. 3 is a view corresponding to Fig. 1 and showing a modification of my invention. Fig. 4 is a plan of the same corresponding to Fig. 2. Fig. 5 is a view corresponding to Fig. 1 taken on an irregular plane of section and showing another modification of my invention. Fig. 6 is a plan of the same corresponding to Fig. 2, the paddles being omitted for clarity of illustration.

In the embodiment of my invention illustrated in Figs. 1 and 2, I employ a preferably cylindrical containing vessel 1 provided with a cover 2. Mounted for rotation within the vessel upon an axis coincident with that of the vessel is a frame 3, shown as substantially rectangular and extending diametrically of the vessel, and suitably pivoted at the bottom, as upon an upwardly projecting central pivot 4 on the bottom of the vessel which engages in a corresponding pivot socket in the bottom of the frame 3. The casing 1 is preferably mounted obliquely upon a base 5 for reasons which will appear hereinafter, and it is so shown, though for convenience of illustration the base is shown oblique and the vessel relatively vertical.

At its top the frame 3 is provided with a central axially projecting shaft 6, which is secured at its inner end as by a pin to the top of the frame 3 and extends upwardly therefrom through a central opening in the cover 2 and serves as the upper pivot or journal for the frame 3. Mounted loosely upon this shaft 6 is a gear wheel 7, the hub of which has a square upper end and projects through a central opening in a keeper bar 8 secured to the top of the frame 3 and raised up therefrom. A locking bar 9 has bifurcated downwardly-extending flanged ends fitting over lugs 10 on diametrically opposite sides of the inner wall of the vessel 1, and this locking bar has a square central opening fitting over the square upper end of the hub of the gear wheel 7, and the gear wheel is thereby held against rotation.

A plurality of parallel shafts, shown as two, 11 and 11ª, are mounted in the frame 3 and extend parallel to its axis of rotation, and the lower ends of these shafts are journaled in bearings in the bottom of the frame 3, and on the upper end of each shaft is fixed a pinion 12 disposed between the keeper bar 8 and the top of the frame 3 and arranged in mesh with the gear wheel 7.

The upper end of the shaft 6 which projects through the cover 2 may be squared, and a removable crank 13 is adapted to fit over this as a means for manual actuation of the shaft. It is now apparent that, as the shaft 6 is rotated, the frame 3 will be rotated and that the shafts 11 and 11ª and their pinions 12 will be revolved therewith about a common axis, and that as a result of their meshing with the stationary gear wheel 7, the pinions will be rotated as they are thus revolved, and that the shafts 11 and 11ª will be thereby given a compound movement, consisting of rotation upon their own axes and a revolving movement about the axis of the frame 3.

As a means for agitating and mixing the material contained in the vessel 1, the shafts 11 and 11ᵃ are provided with a series of paddles, each consisting of a radially extending member and a plurality of members carried by the radial member and extending at an angle therefrom, preferably at right angles thereto, as shown. The shaft 11 in this embodiment is provided with two paddle devices, each paddle device being mounted at its middle upon the shaft 11 and having two radially extending arms 14 and two radially extending arms 15, and each arm being provided with two upwardly extending paddle members 16 and two downwardly extending paddle members 17. The shaft 11ᵃ in this embodiment is provided with three paddle devices, each consisting of the two radially extending arms 14 and two radially extending arms 15, and the middle one being disposed in a plane substantially midway between those of the two paddle devices on the shaft 11, and being provided with upwardly and downwardly extending members 16 and 17, similar to those carried by the shaft 11. The other two paddle devices also consist of the four arms 14 and 15 and one is arranged in a plane above the upper paddle device on the shaft 11 and the other is arranged in a plane below the lower paddle device on the shaft 11, the former being provided with the downwardly extending paddle members 17 and the latter being provided with the upwardly extending paddle members 16.

The paddle devices on the two shafts 11 and 11ᵃ are of such length that they rotate in overlapping planes and, since they are arranged in the same relative angular disposition on the shafts 11 and 11ᵃ and since they are rotated at the same speed, the angularly extending members 16 and 17 on the two shafts intermesh during their rotation, as shown in Fig. 1. They, therefore, operate upon the material in every part of the container. In addition to this overlapping and intermeshing of the rotating paddles, the paddles are so shaped and arranged that they produce in their rotation a plurality of series of compound and complex currents flowing in different directions. To effect this, the component members of the paddle devices are obliquely inclined, the paddle arms 14 being oppositely inclined to the paddle arms 15, and the angularly extending members 16 being oppositely inclined to the members 17, and the paddles on the two shafts being so arranged that the intermeshing members are oppositely inclined, with the result that the paddles of one series set up currents which intersect and are opposed to those set up by the other series of paddles, and a great variety of oppositely flowing currents are produced which serve to very thoroughly disintegrate and mix the material being treated. The bottom and sides of the frame 3 are also provided with or composed of obliquely set blades 3′ which rotate in proximity to the walls of the vessel 1 and draw the material away from the walls of the vessel toward the center where it will be acted upon by the paddles. Instead of the angularly extending members being vertical, as shown in Figs. 1 and 2, they may be inclined to the vertical, as shown in Fig. 1ᴬ, those on one side of the shaft being inclined oppositely to those on the other side of the shaft. By these means the currents set up by them are at an angle to the horizontal and the currents set up by those on one side of the shaft intersects the currents created by those on the opposite side of the shaft, and a thorough mixing results. In assembling the parts, the frame 3 and parts carried thereby are first inserted in their proper positions, the locking bar 9 is then placed on, and finally the cover 2 and handle 13 put on.

The construction shown in Figs. 3 and 4 differs from that shown in Figs. 1 and 2 in that instead of the shaft 6, a shaft 6′ extends to the bottom of the frame and carries paddles similar to the shaft 11 previously described, and arranged on opposite sides of this are two shafts 11ᵃ, each carrying paddles similar to those on shaft 11ᵃ of the previous constructions. Thus three series of rotative paddles are provided, the outer two of which also revolve about the rotative axis of the central series of paddles.

By means of my improved mixer I produce a series of currents flowing in opposite directions, in approximately a horizontal plane, and also a series of currents moving in approximately a vertical plane in opposite directions, and the result is a very thorough agitation and mixing of the ingredients or contents of the vessel. By reason of having the containing vessel mounted obliquely on its base, the action of gravity is added as an additional element in causing a change of position of the particles of the material being mixed, and thereby a more thorough mixing of the material is obtained. By drawing the material away from the bottom and sides of the vessel during the operation of the device, the material is all brought within the radius of the paddles and the clogging of the paddles is also prevented.

The construction shown in Figs. 5 and 6 differs from that shown in Figs. 3 and 4 in that, instead of a cylindrical vessel, a vessel 1ᵃ of the form of a truncated cone with its lower end the smaller is used, and the frame 3ᵃ is made correspondingly narrower at the bottom than it is at the top. In addition the shafts 11ᵃ are displaced from the parallel, their upper ends remaining in the same relative disposition as in Fig. 5, and the lower end of one shaft 11ª being set in toward and back of the central shaft 6', and the lower end of the other shaft 11ª being set in toward and forward of the central shaft 6', the frame 3ª being correspondingly skewed, as shown in Fig. 6. The paddles 14 and 15 on the shafts 11ª are, therefore, arranged at an angle to the horizontal, and, consequently, the angularly extending members 16 and 17 are disposed at an angle to the vertical axis of the vessel and tend to create currents in an oblique direction as the paddles are rotated, thereby causing a very effective agitation and mixture of the contents of the vessel. As a result of this construction, the gear wheels 12 are turned at an angle to the gear wheel 7, and they, consequently, are provided with skew bevel teeth. The cover 2, the locking bar 9 and the keeper bar 8 are also shaped to conform to the top of the gear wheels.

It is obvious that various other modifications may be made in the constructions shown and above particularly described within the principle and scope of my invention.

I claim:

1. A mixing machine comprising a containing vessel, a central axially-extending rotative paddle-bearing shaft mounted therein, two outer rotative paddle-bearing shafts mounted in the vessel and arranged with their lower ends offset from a plane passing through the axis of the central shaft and containing the centers of the upper ends of the outer shafts, three series of substantially radially extending paddles, one series carried by each shaft, the paddles of the central shaft being adapted to overlap those of the two outer shafts during their rotation, and means to simultaneously rotate the three shafts.

2. A mixing machine comprising a containing vessel, a central axially-extending rotative paddle-bearing shaft mounted therein, two outer rotative paddle-bearing shafts mounted in the vessel and arranged with their lower ends offset from a plane passing through the axis of the central shaft and containing the centers of the upper ends of the outer shafts, three series of substantially radially extending paddles, one series carried by each shaft, the paddles of the central shaft being adapted to overlap those of the two outer shafts during their rotation, means to simultaneously rotate the three shafts, and means to revolve the two outer shafts about the central shaft.

3. A mixing machine comprising a substantially truncated conical vessel, a central axially-extending rotative paddle-bearing shaft mounted therein, two outer rotative paddle-bearing shafts mounted in the vessel substantially parallel to the sides thereof and arranged with their lower ends offset from a plane passing through the axis of the central shaft and containing the centers of the upper ends of the outer shafts, three series of substantially radially extending paddles, one series carried by each shaft, the paddles of the central shaft being adapted to overlap those of the two outer shafts during their rotation, angularly-disposed members carried by the paddles and extending transversely to the plane of rotation, the angularly-disposed members of the different series of paddles being arranged to intermesh during the rotation of the paddles, and means to simultaneously rotate the three shafts.

4. A mixing machine comprising a substantially truncated conical vessel, a central axially-extending rotative paddle-bearing shaft mounted therein, two outer rotative paddle-bearing shafts mounted in the vessel substantially parallel to the sides thereof and arranged with their lower ends offset from a plane passing through the axis of the central shaft and containing the centers of the upper ends of the outer shafts, three series of substantially radially extending paddles, one series carried by each shaft, the paddles of the central shaft being adapted to overlap those of the two outer shafts during their rotation, angularly-disposed members carried by the paddles and extending transversely to the plane of rotation, the angularly-disposed members of the different series of paddles being arranged to intermesh during the rotation of the paddles, the paddles and the angularly-disposed members of the different series being obliquely inclined so as to create a series of currents flowing in opposite directions, and means to simultaneously rotate the three shafts.

5. A mixing machine comprising a containing vessel, a plurality of rotative paddle-bearing shafts mounted therein, a plurality of series of radially extending paddles, one series carried by each shaft, the paddles of the different series being adapted to overlap during their rotation, angularly disposed members carried by the paddles and extending transversely to the plane of rotation, the angularly disposed members of the different series of paddles being arranged to intermesh during the rotation of the paddles, the paddles and the angularly disposed members of the different series being obliquely inclined in opposite directions, so as to create a series of currents flowing in opposite directions, and means to rotate the shafts and to revolve at least one of them about substantially the central axis of the containing vessel.

6. A mixing machine comprising a containing vessel, a plurality of rotative paddle-bearing shafts mounted therein, a plurality of series of radially extending paddles, one series carried by each shaft, the paddles of the different series being adapted to overlap during their rotation, angularly disposed members carried by the paddles and extending transversely to the plane of rotation, the angularly disposed members of the different series of paddles being arranged to intermesh during the rotation of the paddles, the paddles and the angularly disposed members of the different series being obliquely inclined in opposite directions so as to create a series of currents flowing in opposite directions, means revoluble near the wall of the containing vessel to draw the material being treated away from the inner face of the vessel, and common actuating means.

In testimony whereof, I have affixed my signature in presence of two witnesses.

CHAS. H. J. DILG.

Witnesses:
G. BAMMANN,
WM. A. LINDSAY.